United States Patent [19]
Thatcher, Jr.

[11] Patent Number: 5,285,497
[45] Date of Patent: Feb. 8, 1994

[54] METHODS AND APPARATUS FOR SCRAMBLING AND UNSCRAMBLING COMPRESSED DATA STREAMS

[75] Inventor: William B. Thatcher, Jr., Atlanta, Ga.

[73] Assignee: Scientific Atlanta, Norcross, Ga.

[21] Appl. No.: 41,727

[22] Filed: Apr. 1, 1993

[51] Int. Cl.$^5$ ............................................. H04L 9/00
[52] U.S. Cl. ...................................... 380/49; 380/9; 380/10; 380/28
[58] Field of Search ............... 380/9, 10, 4, 20, 49, 380/28

[56] References Cited

U.S. PATENT DOCUMENTS

| | | | |
|---|---|---|---|
| 4,301,327 | 11/1981 | Lee et al. | 380/28 |
| 4,720,861 | 1/1988 | Bertrand | 381/36 |
| 5,204,899 | 4/1993 | Israelsen et al. | 380/10 |
| 5,226,082 | 7/1993 | Kustka | 380/28 |

OTHER PUBLICATIONS

U.S. Pat. application Ser. No. 968,846 filed Oct. 30, 1992.

*Primary Examiner*—David C. Cain
*Attorney, Agent, or Firm*—Woodcock Washburn Kurtz Mackiewicz & Norris

[57] ABSTRACT

Methods and apparatus for encoding compressed data streams efficiently, and methods and apparatus for decoding the encrypted data streams efficiently and inexpensively, are disclosed. In an encoder 10', an incoming data stream is fed to a Huffman coding block 10 that performs data compression. The output codewords of the Huffman coding block are fed to a forward error correction block 30, the output of which is a series of data blocks and associated parity data. The data blocks are fed to an error insertion block 32, which inserts a one-bit error in each data block. The parity data is fed to a first encryption block 34 that produces encrypted parity data. The output of the error insertion block 32, the encrypted parity data, and a synchronization word output by a sync generator 50 are fed to a multiplexer 48. A seed generator block 36 generates random numbers for use by the first encryption block 34 as seeds for encrypting the parity data. A multisession key register 40 stores a multisession key employed as a seed in a second encryption block 38 to encrypt the random number seed. A secret serial number (SSN) read from a database 46 and stored in an SSN register 44 is employed by a third encryption block 42 as a seed for encrypting the multisession key. The multiplexer outputs a multiplex comprising the sync signal, SDP, ADP, and Reed-Solomon data blocks with their corresponding parity data. A decoder 14' receives the multiplex data and recovers the original data.

31 Claims, 3 Drawing Sheets

METHODS AND APPARATUS FOR SCRAMBLING AND UNSCRAMBLING COMPRESSED DATA STREAMS

FIELD OF THE INVENTION

The present invention relates generally to the fields of data compression and data encryption. More particularly, the present invention relates to methods and apparatus for encrypting, or scrambling, digital data compressed into variable length codewords. The invention may advantageously be applied in digital video and audio systems to provide efficient and inexpensive encryption and decryption.

BACKGROUND OF THE INVENTION

The background of the present invention is described herein in the context of pay television systems, such as cable television and direct broadcast satellite (DBS) systems, that distribute a variety of program services to subscribers, but the invention is by no means limited thereto except as expressly set forth in the accompanying claims.

In the pay television industry, programmers produce programs for distribution to various remote locations. A "program" may consist of video, audio, and other related services, such as closed-captioning and teletext services. Typically, a programmer will supply these services via satellite to individual subscribers and/or cable television operators. In the case of cable television operators, the services transmitted via satellite are received at the operator's cable head-end installations. A cable operator typically receives programs and other services from many programmers and then selects the programs/services it wishes to distribute to its subscribers. In addition, a cable operator may insert locally produced services at the cable-head end. The selected services and locally produced services are then transmitted to the individual subscribers via a coaxial cable distribution network. In the case of DBS subscribers, each subscriber is capable of receiving a satellite downlink from the programmers directly.

In the past, pay television systems, including cable and DBS systems, have operated in the analog domain. Recently, however, the pay television industry has begun to move toward all digital systems wherein, prior to transmission, all analog signals are converted to digital signals. Digital signal transmission offers the advantage that digital data can be processed at both the transmission and reception ends to improve picture quality. Further, digital data compression techniques have been developed that achieve high signal compression ratios. Digital compression allows a larger number of individual services to be transmitted within a fixed bandwidth. Bandwidth limitations are imposed by both satellite transponders and coaxial cable distribution networks, and therefore digital compression is extremely advantageous. Further background on digital television can be found in U.S. patent application Ser. No. 968,846, Oct. 30, 1992, titled *System and Method for Transmitting a Plurality of Digital Services*, which is hereby incorporated by reference as if fully set forth herein.

FIG. 1 schematically depicts a portion of a digital television system. This system comprises an encoder 10, a digital channel 12, and a decoder 14. The encoder and decoder each have access to identical Huffman lookup tables (or code books) 16 for use in compressing and decompressing digital program data. Exemplary program data is represented by the sequence of numbers 18 at the input of the encoder 10 and the output of the decoder 14. The compressed data (sequence of codewords) is represented by the sequence of bit patterns 20. Huffman coding is a variable length coding (VLC) process that encodes frequent events with fewer bits than it encodes infrequent events. As illustrated in the following table (which is also shown in FIG. 1), variable length codewords are preassigned to the symbols representable in the system in accordance with a Huffman code.

| HUFFMAN TABLE | |
|---|---|
| Symbol | Codeword |
| 0 | 0 |
| −1 | 100 |
| −2 | 101 |
| +2 | 110 |
| −3 | 11100 |
| +1 | 11101 |
| +7 | 11110 |

In a digital video system, identical code books, typically stored in read only memory, are employed at the data encoder and decoder locations. The decoder is able to separate the received codewords to perform the decompression process, despite the fact that the codewords are of variable lengths, because only prescribed symbols are allowed. For example, if the bits "0100101" were received, the decoder would be able to separate this received data stream into the codewords "0", "100", and "101". Typically, a synchronization pattern is employed to separate large groups of codewords. However, the decoder still must be able to separate the individual codewords between the synchronization patterns.

Thus, the most efficient compression is obtained when variable length coding (VLC) is used. However, because of the variable codeword lengths, if a single bit error occurs, the Huffman decoder will lose synchronization and be unable to recover any data following the error. For example, if the data stream "0100101" were changed to "1100101" due to an erroneous inversion of the first bit, the decoder would be unable to decide whether the received data stream should be interpreted as "1100", "101" (two distinct codewords), or "110", "0", "101" (three distinct codewords). In view of the problems associated with decoding variable length codewords in most real world environments, where bit errors are likely, forward error correction (FEC) should be employed to detect and correct errors before Huffman coding is performed. For example, the Reed-Solomon algorithm is a well known FEC technique whereby parity data is computed and transmitted with data blocks of a prescribed length. The parity data enables the decoder to detect and correct errors in the codewords before decompressing the codewords to recover the original data.

Theft is also a serious problem in the pay television world. Thieves have been known to illegally decode program data with home made or stolen decoders. Highly sophisticated encryption techniques for scrambling the program data before it is distributed to cable television operators and individual subscribers are known. For example, the Data Encryption Standard (DES), described in *NBS, Data Encryption Standard* (FIPS Publication 46), National Bureau of Standards, U.S. Department of Commerce, Washington, D.C. (January, 1977)), and the Rivest-Shamir-Adleman (RSA) scheme, described in R. L. Rivest, A. Shamir, and L. Adleman, *A Method of Obtaining Digital Signatures and Public-key Cryptosystems*, Communications of the ACM 21(2), pp. 120-126 (February, 1978)), are well known. However, decryption of high speed data requires complex, specially designed circuitry, usually in the form of application specific integrated circuits (ASICs). The ASICs are expensive but are needed to perform decryption rapidly, in real time. Therefore, the benefit gained by employing encryption to deter program theft is offset by the cost incurred by the decryption circuitry.

Accordingly, a primary goal of the present invention is to provide methods and apparatus for encrypting digital data streams in a manner that enables decryption in real time with inexpensive hardware.

SUMMARY OF THE INVENTION

The present invention provides methods and apparatus for encoding compressed data streams efficiently, and methods and apparatus for decoding the encrypted data streams efficiently and inexpensively. Methods for encoding data in accordance with the present invention comprise the steps of: compressing an incoming data stream into variable length codewords; generating error correction parity data for the codewords; introducing an error into the codewords; encrypting the parity data; and transmitting the codewords and encrypted parity data.

A preferred embodiment of the present invention further comprises the steps of generating a seed for encrypting the parity data, encrypting the seed, and transmitting the encrypted seed as a system data packet (SDP).

In addition, embodiments of the invention may include the steps of employing a multisession key to encrypt the seed, encrypting the multisession key, and transmitting the encrypted multisession key as an addressable data packet (ADP).

Embodiments of the invention may also include the step of employing a secret serial number (SSN) to encrypt the multisession key.

The encrypted parity data may advantageously be transmitted before the codewords are transmitted. This provides the decoder more time to decrypt the parity data, and is useful in that the decrypted parity data is required by the decoder when correcting the deliberate error in the program data. In addition, the step of generating error correction parity data may advantageously employ a Reed-Solomon forward error correction process, whereby parity words and associated data blocks are generated. The step of encrypting the parity data may comprise inserting one error per Reed-Solomon data block, and the step of compressing an incoming data stream into variable length codewords may employ Huffman coding to generate variable length Huffman codewords.

Preferred embodiments may also include the steps of generating a synchronization word; multiplexing the synchronization word with the codewords and encrypted parity data before transmitting the codewords and encrypted parity data; and transmitting the multiplexed data.

The present invention also provides encoders including means for carrying out the above-described methods. In one preferred embodiment, the first, second, and third decryption means, and the means for storing an SSN, are embodied in a secure microprocessor, making it extremely difficult for an unauthorized person to discover the SSN and decryption processes.

The present invention also provides methods and apparatus for decoding the encrypted data. According to the invention, a decoder receives an incoming data stream and demultiplexes the data stream into variable length codewords representing a compressed data stream, encrypted parity data, a system data packet (SDP) defining an encrypted seed, and an addressable data packet (ADP) defining an encrypted multisession key. The ADP is then decrypted to derive the multisession key; the SDP is decrypted in accordance with the multisession key to derive the seed; the parity data is decrypted in accordance with the seed; errors in the codewords are corrected in accordance with the decrypted parity data; and a decompressed data stream is generated in accordance with the corrected codewords.

Thus, in preferred embodiments of the invention, a deliberate error is added to the Huffman codewords in the encoder and the associated FEC parity bytes are encrypted. The parity bytes are much smaller than the coded data, and thus can be decrypted off-line in a microprocessor. Consequently, decryption of high-speed program data is accomplished effectively by background decryption of the FEC parity bytes, enabling the FEC means in the decoder to correct the deliberate error. The present invention simplifies encryption and decryption of high-speed program data by employing the FEC system and hardware, which is typically used for correction of noise-induced errors, for an additional purpose: to provide conditional access to the program data. Off-line (or background, or non-real time) hardware can be used to perform real time decryption of the high-speed program data. Decoder cost may therefore be significantly reduced. Other features and advantages of the present invention are disclosed below.

DETAILED DESCRIPTION OF PREFERRED EMBODIMENTS

Figure 1:
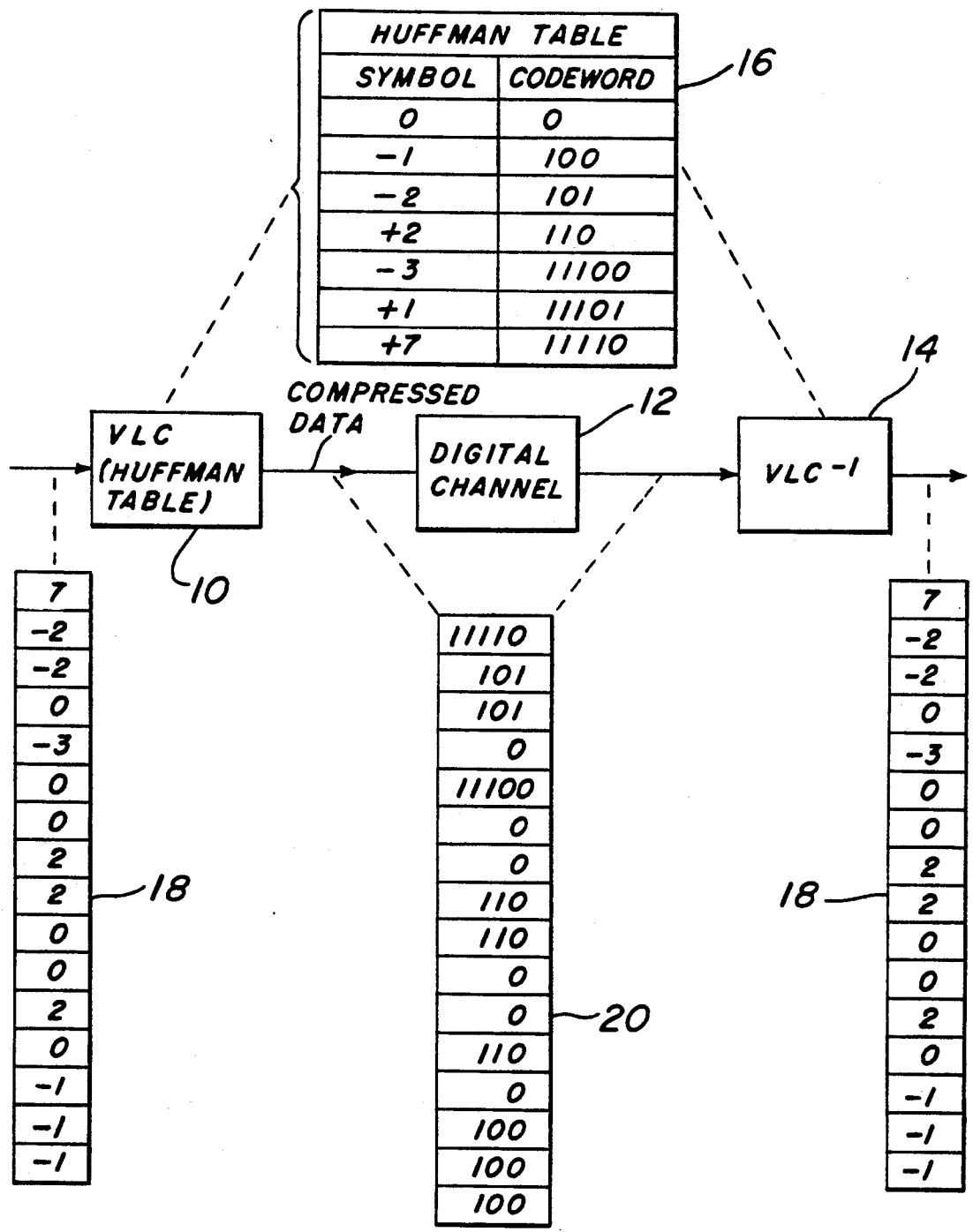
FIG. 1 is a schematic representation of a digital television system comprising an encoder 10, a digital channel 12, and a decoder 14.
Figure 2:
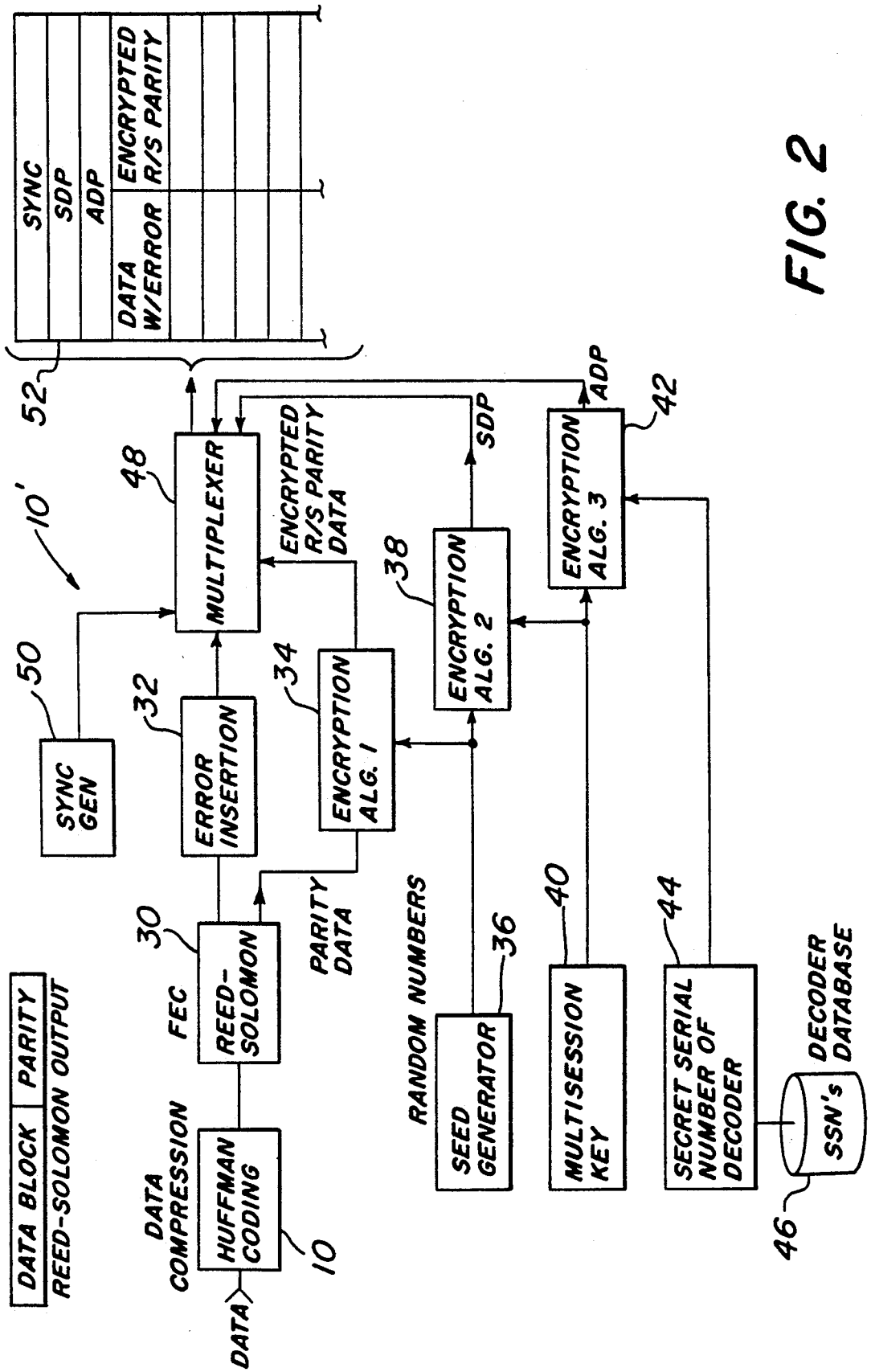
FIG. 2 is a block diagram of an encoder 10' in accordance with the present invention.

FIG. 2 schematically depicts one embodiment of an encoder 10' in accordance with the present invention. As shown, an incoming data stream is fed to a Huffman coding block 10 that performs data compression. The output codewords of the Huffman coding block are fed to a Reed-Solomon forward error correction block 30, the output of which is a series of data blocks and associated parity data. The data blocks are fed to an error insertion block 32, which inserts a one-bit error in each data block. The parity data is fed to a first encryption block 34 that employs a known encryption algorithm, e.g., the DES algorithm, to produce encrypted parity data. The output of the error insertion block 32, the encrypted parity data, and a synchronization word output by a sync generator 50 are fed to a multiplexer 48. In addition, a seed generator block 36 generates random numbers for use by the first encryption block 34 as seeds for encrypting the parity data. A multisession key register 40 stores a multisession key employed as a seed in a second encryption block 38 to encrypt the random number seed. The encrypted random number seed is referred to herein as a system data packet (SDP). A secret serial number (SSN) read from a database 46 and stored in an SSN register 44 is employed by a third encryption block 42 as a seed for encrypting the multisession key. The encrypted multisession key output by the third encryption block 42 is referred to herein as an addressable data packet (ADP). As shown, the SDP and ADP are also fed to the multiplexer 48. The multiplexer outputs a multiplex comprising the sync signal, SDP, ADP, and Reed-Solomon data blocks with their corresponding parity data. In one example of the present invention, the random number seed changes at a rate of eight times per second; the multisession key is changed at a rate of one time per month; and the secret serial number is a fixed number stored in the database 46. There is a unique SSN for each authorized decoder in the system.

Figure 3:
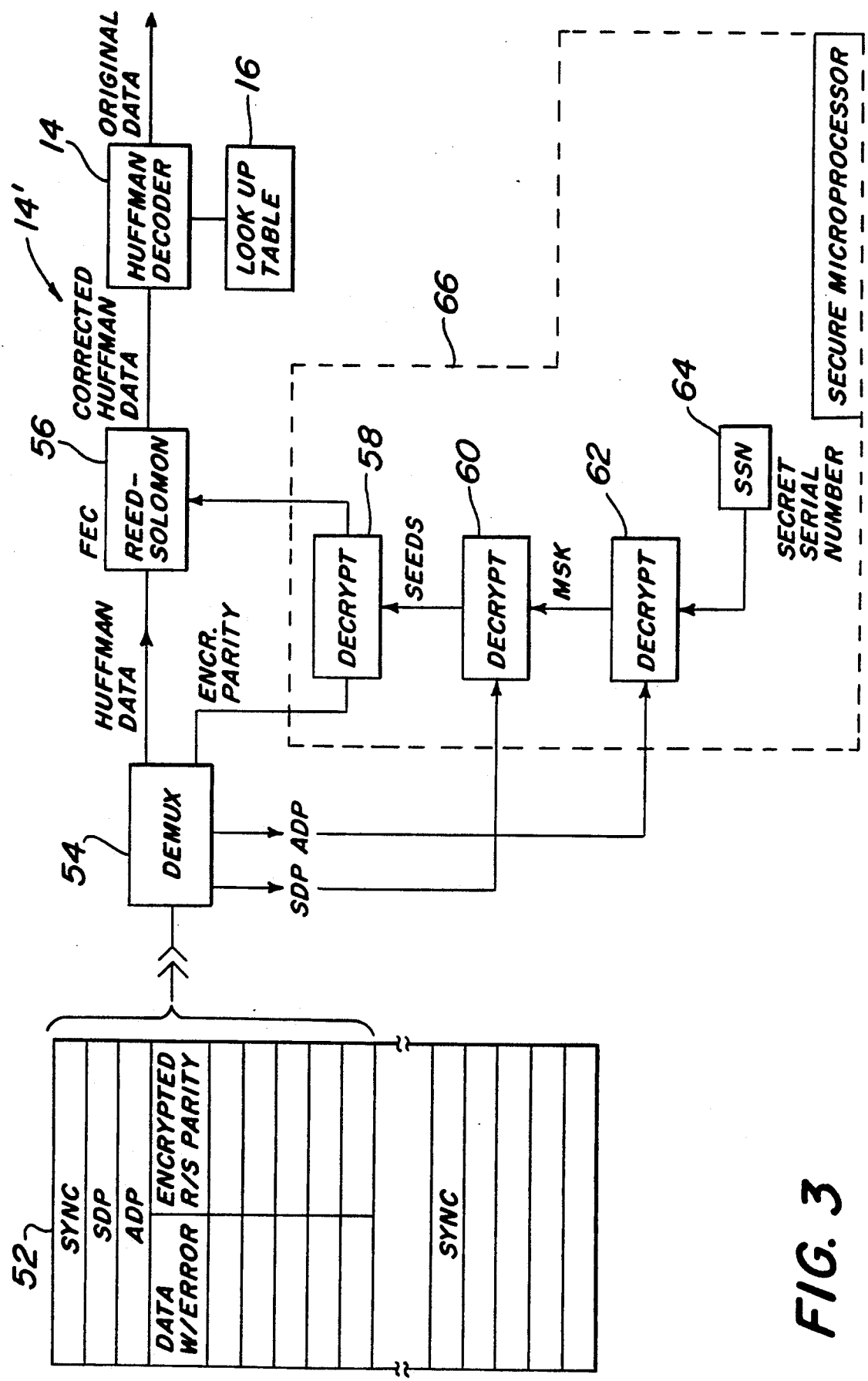
FIG. 3 is a block diagram of a decoder 14' in accordance with the present invention.

FIG. 3 schematically depicts one embodiment of a decoder in accordance with the present invention. As shown, multiplex data 52 is received and fed to a demultiplexer 54, which separates out the Huffman data, encoded parity data, SDP, and ADP. The Huffman data blocks are fed to a Reed-Solomon FEC block 56, which outputs corrected Huffman data. Since the FEC block 56 requires decrypted parity data to perform error correction on the program data, the encrypted parity data is fed to a first decryption block 58, which decrypts the parity data in accordance with the decryption process corresponding to the encryption process employed by the encoder. The first decryption block 58 employs the random number seed generated by the random number generator of the encoder. Thus, the SDP (which is the encrypted version of the random number seed) must also be decrypted to obtain the random number seed. To decrypt the SDP, the ADP is decrypted to produce the multisession key, the latter being employed as a seed in a second decryption block 60. The ADP is decrypted by employing the decoder's secret serial number, which is stored in memory 64 inside the decoder, as a seed for a third decryption block 62. The output of the Reed-Solomon FEC block 56 is a series of compressed but corrected Huffman codewords. The corrected Huffman codewords are fed to a Huffman decoder 14, which employs a lookup table 16 to produce the original compressed data.

In preferred embodiments of the invention, the first, second and third decryption blocks, as well as the decoder's secret serial number, are embodied in a secure microprocessor, for example, a Motorola SC21 or SC27 secure microprocessor. Such a microprocessor has a limited number of pins (e.g., six) and employs extraordinary measures to prevent an unauthorized person from discovering the SSN or the decryption procedures employed in the decoder.

It will be appreciated by those skilled in the art that changes could be made to the embodiments described herein without departing from the inventive concepts thereof. For example, the present invention is not limited to systems employing any particular encryption technique (e.g., DES) or compression technique (e.g., Huffman coding), although the invention is especially well suited for systems employing variable length coding, since the latter systems must employ forward error correction. In addition, embodiments of the invention may introduce more than one error into the codewords or introduce one or more errors into some but not all codewords. It is understood, therefore, that the scope of protection of the following claims is not limited to the particular embodiments disclosed, but is broad enough to encompass all modifications which are within the true scope and spirit of the invention.

What is claimed is:

1. A method for encoding data, comprising the steps of:
    (a) compressing an incoming data stream into variable length codewords;
    (b) generating error correction parity data for said codewords;
    (c) introducing an error into said codewords;
    (d) encrypting said parity data; and
    (e) transmitting said codewords and encrypted parity data.

2. A method for encoding data as recited in claim 1, further comprising the steps of generating a seed for encrypting said parity data, encrypting said seed, and transmitting the encrypted seed as a system data packet (SDP).

3. A method for encoding data as recited in claim 2, further comprising the steps of employing a multisession key to encrypt said seed, encrypting said multisession key, and transmitting the encrypted multisession key as an addressable data packet (ADP).

4. A method for encoding data as recited in claim 3, comprising the step of employing a secret serial number (SSN) to encrypt said multisession key.

5. A method for encoding data as recited in claim 1, wherein said encrypted parity data is transmitted before said codewords are transmitted.

6. A method for encoding data as recited in claim 1, wherein the step of generating error correction parity data comprises employing a Reed-Solomon forward error correction process, whereby parity words and associated data blocks are generated; and the step of encrypting said parity data comprises inserting at least one error per data block.

7. A method for encoding data as recited in claim 1, wherein the step of compressing an incoming data stream into variable length codewords comprises employing Huffman coding to generate variable length Huffman codewords.

8. A method for encoding data as recited in claim 1, comprising the steps of generating a synchronization word; multiplexing said synchronization word with said codewords and encrypted parity data before transmitting said codewords and encrypted parity data; and transmitting the multiplexed data.

9. A method for encoding data as recited in claim 1, further comprising the steps of: generating a seed for encrypting said parity data; encrypting said seed by employing a multisession key; encrypting said multisession key by employing a secret serial number (SSN); generating a synchronization word; multiplexing said synchronization word, codewords, encrypted parity data, encrypted seed, and encrypted multisession key, before transmitting said codewords and encrypted parity data; and transmitting the multiplexed data.

10. A method for encoding data as recited in claim 9, wherein the step of generating error correction parity data comprises employing a Reed-Solomon forward error correction process, whereby parity words and associated data blocks are generated; the step of encrypting said parity data comprises inserting at least one error per data block; and the step of compressing an incoming data stream into variable length codewords comprises employing Huffman coding to generate variable length Huffman codewords.

11. An apparatus for encoding data, comprising:
   (a) means for compressing an incoming data stream into variable length codewords;
   (b) means for generating error correction parity data for said codewords;
   (c) means for introducing an error into said codewords;
   (d) means for encrypting said parity data; and
   (e) means for transmitting said codewords and encrypted parity data.

12. An apparatus for encoding data as recited in claim 11, further comprising means for generating a seed for encrypting said parity data, means for encrypting said seed, and means for transmitting the encrypted seed as a system data packet (SDP).

13. An apparatus for encoding data as recited in claim 12, further comprising means for employing a multisession key to encrypt said seed, means for encrypting said multisession key, and means for transmitting the encrypted multisession key as an addressable data packet (ADP).

14. An apparatus for encoding data as recited in claim 13, comprising means for employing a secret serial number (SSN) to encrypt said multisession key.

15. An apparatus for encoding data as recited in claim 11, comprising means for transmitting said encrypted parity data before transmitting said codewords.

16. An apparatus for encoding data as recited in claim 11, wherein the means for generating error correction parity data comprises means for employing a Reed-Solomon forward error correction process, whereby parity words and associated data blocks are generated; and the means for encrypting said parity data comprises means for inserting at least one error per data block.

17. An apparatus for encoding data as recited in claim 11, wherein the means for compressing an incoming data stream into variable length codewords comprises means for employing Huffman coding to generate variable length Huffman codewords.

18. An apparatus for encoding data as recited in claim 11, comprising means for generating a synchronization word; means for multiplexing said synchronization word with said codewords and encrypted parity data before transmitting said codewords and encrypted parity data; and means for transmitting the multiplexed data.

19. An apparatus for encoding data as recited in claim 11, further comprising: means for generating a seed for encrypting said parity data; means for encrypting said seed by employing a multisession key; means for encrypting said multisession key by employing a secret serial number (SSN); means for generating a synchronization word; means for multiplexing said synchronization word, codewords, encrypted parity data, encrypted seed, and encrypted multisession key, before transmitting said codewords and encrypted parity data; and means for transmitting the multiplexed data.

20. An apparatus for encoding data as recited in claim 19, wherein the means for generating error correction parity data comprises means for employing a Reed-Solomon forward error correction process, whereby parity words and associated data blocks are generated; the means for encrypting said parity data comprises means for inserting one error per data block; and the means for compressing an incoming data stream into variable length codewords comprises means for employing Huffman coding to generate variable length Huffman codewords.

21. An apparatus for decoding data, comprising:
   (a) demultiplexer means for receiving an incoming data stream and demultiplexing said data stream into variable length codewords representing a compressed data stream, encrypted parity data, a system data packet (SDP) defining an encrypted seed, and an addressable data packet (ADP) defining an encrypted multisession key;
   (b) first decryption means for decrypting said ADP to derive said multisession key;
   (c) second decryption means for decrypting said SDP in accordance with said multisession key to derive said seed;
   (d) third decryption means for decrypting said parity data in accordance with said seed;
   (e) error correction means for correcting errors in said codewords in accordance with the decrypted parity data; and
   (f) decompression means for generating a decompressed data stream in accordance with the corrected codewords.

22. An apparatus for decoding data as recited in claim 21, further comprising means, coupled to said first decryption means, for storing a secret serial number (SSN) for use in decrypting said ADP.

23. An apparatus for decoding data as recited in claim 22, wherein said first, second, and third decryption means, and said means for storing an SSN, are embodied in a secure microprocessor.

24. An apparatus for decoding data as recited in claim 21, wherein said decompression means comprises a Huffman decoder and a look up table.

25. An apparatus for decoding data as recited in claim 21, wherein said error correction means comprises means for employing a Reed-Solomon forward error correction process to correct errors in said codewords.

26. An apparatus for decoding data as recited in claim 23, wherein said decompression means comprises a Huffman decoder and a look up table; and said error correction means comprises means for employing a Reed-Solomon forward error correction process to correct errors in said codewords.

27. A method for decoding data, comprising the steps of:
   (a) receiving an incoming data stream and demultiplexing said data stream into variable length codewords representing a compressed data stream, encrypted parity data, a system data packet (SDP) defining an encrypted seed, and an addressable data packet (ADP) defining an encrypted multisession key;
   (b) decrypting said ADP to derive said multisession key;
   (c) decrypting said SDP in accordance with said multisession key to derive said seed;
   (d) decrypting said parity data in accordance with said seed;
   (e) correcting errors in said codewords in accordance with the decrypted parity data; and
   (f) generating a decompressed data stream in accordance with the corrected codewords.

28. A method for decoding data as recited in claim 27, comprising employing a secret serial number (SSN) to decrypt said ADP.

29. A method for decoding data as recited in claim 27, wherein the step of generating a decompressed data stream comprises employing a Huffman look up table to decompress said codewords.

30. A method for decoding data as recited in claim 27, wherein the step of correcting errors in said codewords comprises employing a Reed-Solomon forward error correction process to correct said errors.

31. A method for decoding data as recited in claim 27, wherein the step of generating a decompressed data stream comprises employing a Huffman look up table to decompress said codewords; and the step of correcting errors in said codewords comprises employing a Reed-Solomon forward error correction process to correct said errors.

* * * * *